United States Patent [19]

Saukaitis

[11] Patent Number: 4,791,167

[45] Date of Patent: Dec. 13, 1988

[54] AUTOXIDIZABLE FLUOROCARBON POLYMER COMPOSITIONS AND METHODS

[75] Inventor: John C. Saukaitis, East Greenwich, R.I.

[73] Assignee: Hoechst Celanese Corporation, Somerville, N.J.

[21] Appl. No.: 172,003

[22] Filed: Mar. 23, 1988

[51] Int. Cl.$^4$ ......................... C08L 27/12; C08F 12/30
[52] U.S. Cl. ..................................... 524/544; 526/243
[58] Field of Search ................ 526/245, 243; 524/490, 524/544

[56] References Cited

U.S. PATENT DOCUMENTS

| | | | |
|---|---|---|---|
| 3,658,857 | 4/1972 | Kleiner et al. | 526/245 |
| 3,736,300 | 5/1973 | Kleiner | 526/245 |
| 3,944,527 | 3/1976 | McCown | 526/245 |
| 3,950,298 | 4/1976 | McCown et al. | 526/323.2 |
| 4,564,561 | 1/1986 | Lore et al. | 526/245 |
| 4,742,140 | 5/1988 | Greenwood et al. | 526/245 |

FOREIGN PATENT DOCUMENTS

| | | | |
|---|---|---|---|
| 0198252 | 10/1986 | European Pat. Off. | 526/245 |
| 62-10119 | 1/1987 | Japan | 526/245 |

Primary Examiner—Joseph L. Schofer
Assistant Examiner—N. Sardfim
Attorney, Agent, or Firm—Perman & Green

[57] ABSTRACT

Resin compositions, soluble in odorless mineral spirits, autooxidizable and air-dryable after application to textiles, leather, wood or other surfaces to form soil, oil and water-repellent coatings. The resin compositions are terpolymers comprising a fluoroaliphatic vinyl monomer, a hydroarbyl higher alkyl vinyl monomer and an acrylic or methacrylic ester of a compound having one or more unsaturated olefinic bonds, which latter ester imparts autoxidizability to the compositions.

11 Claims, No Drawings

AUTOXIDIZABLE FLUOROCARBON POLYMER COMPOSITIONS AND METHODS

BACKGROUND OF THE INVENTION

The present invention relates to novel resinous compositions which are soluble in odorless, halogen-free volatile solvents, such as odorless mineral spirits, to provide solutions which can be sprayed, painted, spread or otherwise coated onto a variety of materials such as textiles, leather, wood or other surfaces and air-dried at room temperatures to form oil- and water-repellent coatings.

It is known to coat a variety of materials with resinous compositions which dry at room temperatures to impart oil- and water-repellent properties. Oleophobic polymeric fluorinated compositions are known to be particularly effective for this purpose. Such compositions contain highly fluorinated aliphatic groups in sufficient amounts to give a high percentage of fluorine in the composition, of the order of 30 to 50 percent fluorine in many cases. Such a high fluorine content tends to make the polymeric compositions substantially insoluble in most organic solvents so that coating from solution in most readily available inexpensive non-halogenated solvents, and most particularly from odorless mineral spirits, is not possible. Coating from emulsions or latices in water is required. This increases the drying time and introduces water which can be harmful to the material or surface being treated. Reference is made to U.S. Pat. Nos. 3,950,298 and 4,564,561 for their disclosure of fluorinated acrylic and methacrylic acid esters, polymeric compositions and their use for treating materials to impart oil- and water-repellent properties. The former patent discloses terpolymer solutions in methyl isobutyl ketone.

Aside from the insolubility of useful amounts of known fluorinated polymeric compositions in most inexpensive non-halogenated volatile organic solvents and most particularly in odorless mineral spirits, i.e., from about 1% to 2% or more, such known compositions generally produce unsatisfactory repellency results on a wide variety of materials.

Known fluorocarbon polymer compositions generally provide an oil repellency of less than 4 on most textiles, leather and wood, and an unsatisfactory aqueous stain repellency particularly in the case of certain textile fabrics and leather in general.

SUMMARY OF THE INVENTION

The present invention is based upon the discovery of certain fluorocarbon terpolymers containing three essential polymerizable monomers, the amounts of which can be varied within limits in order to regulate the oil-resistance and solubility thereof in halogen-free, odorless organic solvents. Such resinous terpolymer compositions are soluble in useful amounts in such solvents and can be sprayed or otherwise coated onto fabrics, leathers, wood or other materials and dried by autoxidation at ordinary room temperatures within a relatively short period of time to provide coatings having exceptional oil- and water-repellent properties.

The novel terpolymers of the present invention comprise polymers prepared by the reaction of three different monomers, namely (1) a fluroaliphatic vinyl monomer, (2) a higher aliphatic hydrocarbyl vinyl monomer and (3) an autoxidizable monomer selected from the group consisting of (a) a fatty acid vinyl monomer; (b) a dicyclopentenyloxy ethyl vinyl monomer and (c) a dicyclopentenyloxy vinyl monomer, and preferably:

1. 20 to 60 percent by weight of fluoroaliphatic vinyl ester monomer, e.g., perfluroalkylethyl acrylate or methacrylate, N-alkyl heptadecafluoroctanesulfonimidoethyl acrylate or methacrylate;

2. 25 to 60 percent by weight of hydrocarbyl higher (e.g., $C_8$ to $C_{20}$) alkyl vinyl ester monomer, e.g., stearylmethacrylate, or the like, and any one of the following:

3(a) 5 to 30 percent by weight of an unsaturated fatty acid vinyl ester monomer such as oleyl acrylate or methacrylate, or 3(b) 5 to 30 percent by weight of a dicyclopentenyloxy alkylene vinyl ester monomer such as acrylate or methacrylate, or 3(c) 5 to 30 percent by weight of a dicyclopentenyloxy vinyl ester monomer such as acrylate or methacrylate.

Monomer (1) of the present compositions must contain a fluoroaliphatic radical terminating in a $CF_3$ group. The fluoroaliphatic radical should contain at least six fully fluorinated carbon atoms which contain the terminal $CF_3$. A perfluoroalkyl group, $C_nF_{2n+1}$, is preferred wherein n is 6 to 12. The monomer should contain at least 25 percent by weight of fluorine in the form of fluoroaliphatic radical and generally about 50–68 percent. The fluoroaliphatic-radical containing monomer provides oil repellency in air.

The fluoroaliphatic radical is a fluorinated, saturated, monovalent, non-aromatic, straight chain aliphatic radical of at least 6 carbon atoms. Hydrogen atoms may be present as substituents in the fluorinated aliphatic radical provided that not more than one atom of hydrogen is present in the radical for every two carbon atoms, and that the radical must at least contain a terminal perfluoromethyl group. "Terminal" in this connection refers to the position in the skeletal chain of the radical which is furthest removed from the backbone chain of the segment. Preferably the fluoroaliphatic radical contains not more than 16 carbon atoms because such a large radical results in inefficient use of the fluorine content.

More particularly, suitable fluoroaliphatic radical-containing (meth)acrylate monomers include those listed in Appendix I and in Appendix II.

APPENDIX I

| | |
|---|---|
| $R_fCH_2CH_2O_2CCHCH_2$ | (1) |
| $C_8F_{17}CH_2CH_2O_2CCHCH_2$ | (2) |
| $R_fCH_2CH_2O_2CCH_3CH_2$ | (3) |
| $C_8F_{17}CH_2CH_2O_2CCCH_3CH_2 (R_f=C_6F_{13}$ to $C_{12}F_{25})$ | (4) |
| $C_8F_{17}SO_2N(C_2H_5)C_2H_4O_2CCHCH_2$ | (5) |
| $C_8F_{17}SO_2N(C_2H_5)C_2H_4O_2CCH_3CH_2$ | (6) |

APPENDIX II

| Inventors | U.S. Pat. No. | Title |
|---|---|---|
| Reid & Husted | 2,642,416 | Fluorinated Acrylates & Polymers |
| Ahlbrecht, Brown & Smith | 2,803,615 | Fluorocarbon Acrylate & Methacrylate Esters & Polymers |
| Bovey & Abere | 2,826,564 | Fluorinated Acrylate & Polymers |

-continued
APPENDIX II

| Inventors | U.S. Pat. No. | Title |
|---|---|---|
| Ahlbrecht & Smith | 3,102,103 | Perfluoroalkyl Acrylate Polymers & Process of Producing a Latex Thereof |
| Johnson & Raynolds | 3,256,230 | Polymeric Water & Oil Repellents |
| Johnson & Raynolds | 3,256,231 | Polymeric Water & Oil Repellents |
| Fasnick & Raynolds | 3,282,905 | Fluorine Containing Esters & Polymers Thereof |
| Smith & Sherman | 3,329,661 | Compositions and Treated Articles Thereof |
| Smith & Sherman | 3,356,628 | Copolymers of Perfluoro Acrylate Hydroxy Alkyl Acrylates |
| Farah & Gilbert | 3,407,183 | Acrylate & Methacrylate Esters and Polymers Thereof |
| Kleiner | 3,412,179 | Polmers of Acrylyl Perfluorohydroxamates |
| Pacini | 3,445,491 | Perfluoroalkylamido-alkylthio Methacrylates and Acrylates & Intermediates Therefor |
| Eygen & Carpentier | 3,470,124 | New Fluorinated Compounds & Their Preparation |
| Brace | 3,544,537 | Poly(perfluoroalkyoxy)-poly-fluoroalkylacrylate-Type Esters & Their Polymers |
| Caporiccio & Strepparola | 3,814,741 | Acrylic and Methacrylic Monomers, Polymers & Copolymers |

The second component, or monomer (2) in the polymers of the invention is a higher aliphatic hydrocarbyl vinyl ester monomer, preferably a higher alkyl or saturated fatty acid acrylate or methacrylate, $C_mH_{2m+1}O_2CC(X)=CH_2$ where m is 8 to 20 and X is H or $CH_3$, used in an amount of 25–60% by weight of the monomer mixture. A particularly convenient component is found to be commercially available stearyl methacrylate in which the stearyl group is a mixture of higher alkyl groups in which $C_{18}H_{37}$ predominates. Examples of suitable monomers are n-hexylacrylate, 2 ethylhexyl acrylate, isooctyl acrylate, decyl acrylate, isodecyl acrylate, isobornyl acrylate, undecyl acrylate, lauryl acrylate, duodecyl acrylate, tridecyl acrylate tetradecylacrylate penta-decyl acrylate, hexadecyl acrylate, and stearyl acrylate as well as the corresponding methacrylates. Styrene, methylstyrene and styrene acetate can also be utilized in mixture with the above mentioned monomers.

(3a) The third component needed for the polymer of the invention may be 3(a) a vinyl monomeric ester compound of the class defined by the general formula:

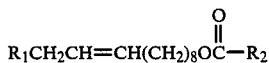

wherein $R_1$ represents a $C_7H_{15}$ alkyl group or a $C_7H_{13}$ or $C_7H_{11}$ alkenyl group and $R_2$ is a residue of a monocarboxylic unsaturated acid, e.g., acrylic or methacrylic.

The preferred compounds are those in which the ester is derived from acrylic acid or methacrylic acid, i.e., $R_2$ is $H_2C=C(R')$— wherein R' is H or $CH_3$. Hereinafter, the term (meth)acrylate is sometimes used as a generic term to embrace both the specific acrylate and specific methacrylate and the term (meth)acrylic acid is also sometimes used to embrace both of these individual acids. While the disclosure and Examples herein specifically refer to the acrylate or methacrylate, nevertheless, applicants intend to cover the use of other unsaturated esters and acids mentioned above under the doctrine of equivalents. The monomer of formula 3(a) may be prepared by reacting the appropriate unsaturated fatty alcohol with acryloyl chloride or methacryloyl chloride in the presence of triethylamine, removing the salt and evaporting the solvent. Compounds of formula 3(a) are known to impart autoxidizability to compositions containing them in Kirk-Othmer, Vol. 8, pages 130–150. There are many vinyl monomers of Formula 3(a) with pendant drying oil functionality, such as those disclosed in Kottke U.S. Pat. No. 3,759,915, Hopwood et al., U.S. Pat. No. 3,590,016 and R. W. Novak and B. B. Kline U.S. Pat. No. 4,233,362 entitled "Water-Soluble air Oxidizing Acrylic Coatings".

Alternatively, the third component needed for the polymer of the invention may be a monomeric compound of the class defined by the general formula 3(b):

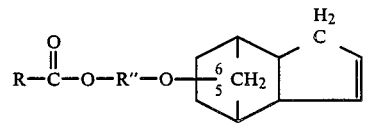

wherein R represents the unsaturated hydrocarbon residue of a monocarboxylic unsaturated acid, e.g., acrylic and methacrylic, and R" represents an alkylene group having 2 to 12, preferably 2 to 6, carbon atoms or an oxaalkylene group having 4 to 12 carbon atoms and having one or more oxygen atoms joining distinct segments of the alkylene groups, each such segment having at least two carbon atoms. R", in preferred embodiments, represents the hydrocarbon residue of a ($C_2$ to $C_6$)-diol or of a ($C_2$ to $C_6$)-glycol containing one or two oxygen atoms joining two or three carbon atom segments of the alkylene groups. The ester-ether chain may be connected to either the 5-position or 6-position of the ring nucleus as indicated in the general formula. In fact, the monomer 3(b) may comprise a mixture of the two compounds in which part of the ester-ether chain is substituted in the 5-position and part is in the 6-position.

The preferred 3(b) compounds are those in which the ester is derived from (meth)acrylic acid or and the R is $H_2C=C(R')$— wherein R' is H or $CH_3$. The monomers of formula 3(b) may be prepared as in U.S. Pat. No. 4,261,872 by first reacting dicyclopentadiene with excess diol, using an acid catalyst to produce an intermediate ether (hydroxy-R"-O-dicyclopentenyl ether) and then esterifying the hydroxyl of the intermediate with the unsaturated acid, e.g., acrylic acid, using an acid catalyst. Compounds of formula 3(b) are known to impart autoxidizability to compositions containing them, as disclosed in U.S. Pat. No. 4,261,872. A final alternative for the third monomer is 3(c), dicyclopentenyloxy acrylate or methacrylate:

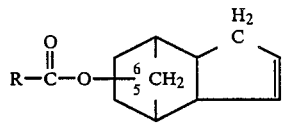

wherein R represents the unsaturated hydrocarbon residue of a monocarboxylic unsaturated acid, e.g., acrylic and methacrylic. The ester chain may be connected to either the 5-position or 6-position of the ring nucleus as indicated in the general formula. In fact, the monomer 3(C) may comprise a mixture of the two compounds in which part of the ester-ether chain is substituted in the 5-position and part is in the 6-position.

The preferred 3(C) compounds are those in which the ester is derived from (meth)acrylic acid or and the R is $H_2C=C(R')$— wherein R' is H or $CH_3$. The monomers of formula 3(b) may be prepared as in U.S. Pat. No. 2,414,089 by first reacting dicyclopentadiene with an unsaturated acid, using an acid catalyst.

Compounds of formula (3(C) are known to impart autoxidizability to compositions containing them, as disclosed in U.S. Pat. No. 2,414,089.

The present polymers are adequately soluble in inexpensive, odorless mineral spirits and show surprisingly good oil and water repellency when applied to surfaces and air dried at room temperature for 6-48 hours. The oil and water repellency will surprisingly improve with curing times of two days to two weeks. Autoxidation of the initial polymer results in a crosslinked polymer with improved repellency characteristics when applied to a variety of surfaces, e.g., wood, leather, textiles, metal, plastic, ceramics and glass, etc.

The polymers of the invention are obtained by standard polymerization procedures. Solvent polymerization has been found most useful. Most conventional solvents are useful, with methyl ethyl ketone, methyl isobutyl ketone and 1,1,2-Trichloro-tri-fluoroethane being preferred.

Total polymer solids as high as 50 percent or more can be obtained in the reaction mixture but solids contents of 36-45 percent are usually of more suitable viscosity.

The product terpolymer, in the form of a solution of from at least about 0.5% by weight and up to the maximum solubility limit, i.e., about 5% by weight, in odorless mineral spirits, can be applied to materials such as fabrics by conventional means, such as spraying, padding, brushing or roll-coating, to provide a treated fabric which, after drying at room temperature has resistance to oily or aqueous stains.

The weight ratio of the components can vary over the broad ranges and will be selected to provide the desired balance of oil and water resistance on the substrate to be treated while preferably maintaining at least a 1-2% solubility in odorless mineral spirits. In general, as the amount of component 1 is increased, oil resistance increases, as the amount of component 2 is increased, the solubility in mineral spirit increases. Component 3 is also essential to these properties of the composition.

The maximum repellency is obtained in 4-8 days. The addition of cobalt naphthenate can shorten the curing time to two days. A two component composition of 1 and 2 alone, give oil repellency values from 1-4 whereas compositions containing 1, 2 and 3 in general give values of 4 or better on most upholstery samples, 4 or better being desirable. The oil repellency of treated fabrics is measured by AATCC Standard Test 118-1978, which test is based on the resistance of treated fabric to penetration by oils of varying surface tensions.

The fluorochemical compositions of this invention can be applied to articles such as textile fabrics, nonwoven webs, single fibers, carpets, and the like made of natural materials such as wool, cotton, cellulose, wood and leather or of synthetic materials such as nylon, acrylics and olefins.

They can also contain adjuvants. It will be frequently desirable to add UV absorbers to increase the polymers' resistance to sun light. Mildewcides and fungicides are desirable additives for application on wool; biocides and antistats for carpet and upholstery.

Most known organic-solvent soluble fluoropolymers have solubility in freon TF, III-trichloroethane and ketone solvents like methylethyl ketone and methylisobutyl ketone. Odorless mineral spirits is preferred because of cost, lack of offensive odor and freedom from the potential health hazards and safety involved with the use of the other solvents mentioned.

The present polymers can be applied as a coating to a surface, i.e., metal, wood, plastic, leather or textile material and can be used in conjunction with an oil-modified unsaturated alkyd resin or other nonvolatile polymeric and resin-forming materials, in the presence of a metal-containing siccative or drier whereby the exposure of a coating containing the polymer and the oil modified alkyd and a siccative results in the production of solid films having a desirable combination of characteristics, i.e., reduced surface tension, oil- and water-repellency.

A suitable siccative or drier is any polyvalent metal-containing complex or salt that catalyzes the oxidative curing or drying oils or drying oil-modified alkyd resin. Examples of the driers are various polyvalent metal salts including calcium, copper, zinc, manganese, lead, cobalt, iron and zirconium as the cation. Simple inorganic salts are useful such as the halide (chloride), nitrate, sulfate or the like. However, in circumstances where the vehicle is of organic nature such as those of the present invention, it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$ to $C_{30}$) aliphatic acids. Examples of the polyvalent metal include calcium, copper, zinc, manganese, lead, cobalt, iron, and zirconium. Examples of the aliphatic or fatty acid component or anion of the drier salt is that of naphthenic acids, resinic acids, (that is, rosin acids) tall oil fatty acids, linseed oil fatty acids, 2-ethylhexoic acid, lauric acid, palmitic acid, myristic acid, stearic acid, oleic acid, linoleic acid, linolenic acid, benenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195-205, published by Interscience Encyclopedia, Inc., N.Y. (1950) may be used.

The proportion of the drier may be quite low and is generally in the amount of 0.0005 to 2% metal content by weight of polymer. The drier may be added to the composition prior to storage provided such addition is made in the absence of oxygen, or a volatile stabilizer is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of the three monomer components. The stabilizer is generally a volatile ketone-oxime or aldehydeoxime. Specific examles are methyl ethyl ketone-oxime, methyl butyl ketone-oxime, 5-methyl-3-heptanone-oxime, cyclohexanoneoxime, and butyraldehyde-oxime.

The drier in conjunction with the presence of oxygen, such as that of the atmosphere, is believed to hasten reaction of the drying oil functionality in the polymer i.e., the fatty acid or dicyclopenteneyl double bond of monomer 3 with another such functionality in the polymer or with another unsaturated monomer that is added to the mixture. However, it should be noted that the polymer alone, or with the addition of an unsaturated alkyd, cures without the presence of a siccative. The composition effectively cures at room temperature 20°–25° C., but can be accelerated by heating i.e., 40°–100° C. or higher in an oven. The time of baking depends upon the particular composition involved as well as film thickness. The autoxidation mechanism discussed herein is not intended to limit the invention to any theory suggested herein.

Any conventional free radical catalysts which are soluble in the solvent system can be used to produce the present telomers. Particularly preferred are azo compounds such as 2,2'-Azobisisobutyronitrile and peroxides such as dilauryl peroxide. Catalyst concentration is suitably 0.1 to 1 percent of weight of monomers.

Conventional chain transfer agents, such as duodecylmercaptan, can be used in amounts of 0.1 to 1 percent preferably about 0.15 to 0.6 percent by the weight of monomer to control the molecular weight of the polymer product during the polymerization step.

The oil repellency of treated materials is measured by AATCC Standard Test 118-1978, which test is based on the resistance of treated material such as fabric to penetration by oils of varying surface tensions. Treated fabrics resistant only to "Nujol", a brand of mineral oil, and the least penetrating of the test oils, are given a rating of 1, whereas treated fabrics resistant to heptane, the most penetrating of the test oils, are given a value of 8. Other intermediate values are determined by use of other pure oils or mixtures of oils. The rated oil repellency corresponds to the most penetrating oil (or mixture of oils) which does not penetrate or wet the fabric after 30 seconds contact. In some cases, ratings in one-half point increments are assigned where slight wetting of the fabric occurred but no penetration is observed. Higher numbers indicate better oil repellency. In general, an oil repellency of 4 or greater is desirable.

The aqueous stain repellency of treated samples is measured using a water/isopropyl alcohol test, and is expressed in terms of the "WATER/IPA" rating of the treated fabric. Treated fabrics are treated with a mixture of water/isopropanol from 100% water/0% isopropanol to 50% water/50% isopropanol. The water repellency corresponds to the most penetrating mixture which does not penetrate or wet the fabric after 30 seconds contact. A rating of 50/50 is most desirable.

Portions of the solutions of the following Examples were diluted in ordorless mineral spirits (OMS) to a concentration of 0.5%–2.0%. This solution is sprayed, brushed or padded, etc. on the substrate being tested. It is sprayed on the upholstery samples and brushed on the leather and wood samples, as identified in Table IV hereof.

Eight 2" square upholstery samples of varying composition are mounted on a 9"×12" cardboard. This piece of cardboard is sprayed with a 1% odorless mineral spirit solution of each fluoro-polymer. The sprayer is a turbomist airless pump sprayer (Century 400, Fountain Valley CA). One pass is made over the samples at a rate of 12"/3 seconds at a distance of 12" from samples. All comparative samples were tested in the same manner. Samples were allowed to air dry at room temperature for various lengths of time with 15 hours being typical. The samples were then tested for oil and water repellency and the test results are given in Table III hereof.

Leather samples were treated by brush application with a 2% odorless mineral spirits solution of fluoropolymer. The leather sample was weighed before and after application to determine wet pick-up. Samples were air dried at room temperature for 15 hours. Testing was the same as for upholstery. Wood application was carried out in the following manner: A 1% OMS solution of fluoropolymer was brushed on a 6"×1"×1/16" piece of white birch board. The sample was allowed to air dry for 15 hours at room temperature and then tested for oil and water repellency with the results given in Table III hereof.

Now, having described the invention broadly, it is more specifically illustrated by examples showing how the invention is practiced and the best mode presently contemplated for practicing the invention. The following examples show solvent polymerization systems and compositions to yield polymers of the invention, from which those skilled in the art will readily perceive variations by which other equivalent polymers are made within the spirit and scope of the present invention.

EXAMPLE 1

A Parr bottle of about 500 ml capacity is charged with:

| | |
|---|---|
| 10 g | Perfluoroalkylethylacrylate (1A) (commercially available from Hoechst/Celanese) |
| 7 g | Stearyl methacrylate (2A) (commercially available from Rohm & Haas) |
| 3 g | Oleyl methacrylate (3A) |
| 0.06 g | Duodecylmercaptan |
| 0.1 g | 1,1'-azobis(cyclohexanecarbonitrile) |
| 36 g | 1,1,2-Trichloro-2,2,1-Trifluoroethane |

The bottle is flushed with oxygen free nitrogen, for 30 seconds, sealed and shaken for 10 hours at a temperature of 105° C. which is maintained by a heating mantle equipped with a temperature controller and temperature probe.

EXAMPLE 2

A Parr bottle of about 500 ml capacity is charged with:

| | |
|---|---|
| 10 g | Perfluoroalkylethylacrylate (1A) |
| 5 g | Stearyl methacrylate (2A) |
| 5 g | Oleyl methacrylate (3A) |
| 36 g | Methyl ethyl ketone |
| 0.1 g | 1,1-azobis(cyclohexanecarbonitrile) |

The bottle is flushed with oxygen free nitrogen for 30 seconds, sealed and shaken for 10 hours at a temperature of 105° C.

EXAMPLES 3–5

The polymers were prepared by a similar procedure as in Example 2 with the proportions and individual monomers given in Tables I and II.

EXAMPLES 6 AND 8-13

The polymers were prepared by a similar procedure as in Example 1 with the proportions and individual monomers given in Tables I and II.

EXAMPLE 7

4.2 g of polymer solution from Example 6 was diluted with 145.8 g of odorless mineral spirits. To this solution was added 0.15 g of a 6% Cobalt Naphthenate solution and the mixture was then applied to upholstery and wood as discussed hereinbefore. After drying for two days, the maximum repellency characteristics given in Table III were obtained.

EXAMPLE 14

A Parr bottle of about 500 ml capacity is charged with:

| | |
|---|---|
| 10 g | Perfluoroalkylethylacrylate (1A) (commercially available from Hoechst/Celanese) |
| 6 g | Stearyl methacrylate (2A) (commercially available from Rohm & Haas) |
| 4 g | Dicyclopentenyloxyethyl methacrylate (3E) (commercially available from Rohm & Haas) |
| 0.2 g | 1,1'-azobis(cyclohexanecarbonitrile) |
| 20 g | Methylethylketone |

The bottle is flushed with oxygen free nitrogen, for 30 seconds, sealed and shaken for 10 hours at a temperature of 105° C. which is maintained by a heating mantle equipped with a temperature controller and temperature probe.

EXAMPLES 15-20, 22-24, 31-35, 37-39, 41 and 42

The polymers were prepared by a similar procedure as in Example 14 with the proportions and individual monomers given in Tables I and II.

EXAMPLE 21

A Parr bottle of about 500 ml capacity is charged with:

| | |
|---|---|
| 10 g | Perfluoroalkylethylacrylate (1A) |
| 7 g | Stearyl Methacrylate (2A) |
| 3 g | Dicyclopentenyloxyethylmethacrylate (3E) |
| 15 g | OMS (odorless mineral spirits) |
| 9 g | 1,1,2-trichloro-2,2,1-trifluoroethane |
| 0.2 g | 1,1-azobis (cyclohexanecarbonitrile) |

The bottle is flushed with oxygen free nitrogen for 30 seconds, sealed and shaken for 10 hours at a temperature of 105° C.

EXAMPLE 25 a Parr bottle of about 500 ml capacity is charged with:

| | |
|---|---|
| 10 g | Perfluoroalkylethylacrylate (1A) |
| 7 g | Stearyl methacrylate (2A) |
| 3 g | Dicyclopentenyloxyethylmethacrylate (3E) |
| 0.06 g | Duodecylmercaptan |
| 36 g | 1,1,2-trichlor-2,2,1-trifluoroethane |
| 0.1 g | 1,1-azobis(cyclohexanecarbonitrile) |

The bottle is flushed with oxygen free nitrogen for 30 seconds, sealed and shaken for 10 hours at a temperature of 105° C.

EXAMPLES 26-30, 36, 40 AND COMPARATIVE EXAMPLES 43 AND 44

The polymers were prepared by a similar procedure as Example 25 with the proportions and individual monomers given in Tables I and II.

As demonstrated by the test results shown in Table III, the novel fluorinated polymer compositions of the present invention provide excellent oil-repellent properties, and water repellent properties for substantially all of the fabrics 1 to 8 identified in Table IV, with water-repellency results of less than 50/50 only on fabric 1 with the composition of Example 10 and with oil-repellency results of less than 4 only on fabric 1 with the compositions of Examples 1, 5, 6, 9 and 10. Excellent oil- and water-repellency were obtained by the use of all of the compositions on wood, as shown by Table III.

The compositions of Examples 1, 3, 4 and 8 were tested on leathers 1 to 7 identified in Table IV to determine the oil- and water-repellent properties imparted thereby, with the results shown in Table III. The compositions of Examples 14 to 30 were tested on leathers 8 to 14 and the compositions of Examples 31-32 on leathers 1 to 7 identified in Table IV, with the test results shown in Table III.

Table III also shows the test results using comparative compositions of Examples 43 and 44, which do not include the third polymer component of the novel compositions of the present invention. The oil- and water-repellency imparted to the fabrics and leathers identified in Table IV demonstrated oil-repellency values less than 4 in most cases, water-repellency values other than 50/50 in many cases and overall combined values which were generally substantially inferior to the protection against oil and water afforded by the novel compositions of the present invention.

TABLE 1

| | | Component (1) |
|---|---|---|
| 1. | A. | $R_fCH_2CH_2OC(O)CHCH_2$ |
| | | ($R_f = C_8F_{17}$ to $C_{12}F_{25}$) |
| | B. | $C_8F_{17}SO_2N(C_2H_5)CH_2CH_2OC(O)CHCH_2$ |
| | C. | $R_fCH_2CH_2OC(O)CCH_3CH_2$ |
| | | ($R_f = C_8F_{17}$ to $C_{12}F_{25}$) |
| | D. | $C_8F_{17}SO_2N(C_2H_5)CH_2CH_2OC(O)CCH_3CH_2$ |
| | E. | $C_8F_{17}CH_2CH_2OC(O)CHCH_2$ |
| | F. | $C_8F_{17}CH_2CH_2OC(O)CCH_3CH_2$ |
| | G. | $R_fCH_2CH_2COCCH_3CH_2$ |
| | | ($R_f = C_8H_{13}$—$C_{12}H_{25}$) |
| | | Component (2) |
| 2. | A. | $C_{18}H_{37}OC(O)CCH_3CH_2$ |
| | B. | $C_{12}H_{25}OC(O)CCH_3CH_2$ |
| | C. | $C_{10}H_{17}OC(O)CHCH_2$ |
| | D. | $C_{10}H_{17}OC(O)CCH_3CH_2$ |
| | E. | $C_{10}H_{21}OC(O)CCH_3CH_2$ |
| | F. | $C_8H_{17}OC(O)CCH_3CH_2$ |
| | | Component (3) |
| 3. | A. | $C_{18}H_{35}OC(O)CCH_3CH_2$ |
| | B. | $C_{18}H_{35}OC(O)CHCH_2$ |
| | C. | $C_{10}H_{13}OCH_2CH_2OC(O)CCH_3CH_2$ |
| | | (Distilled) |
| | D. | $C_{10}H_{13}OCH_2CH_2OC(O)CCH_3CH_2$ |
| | | (Technical Grade) |
| | E. | $C_{10}H_{13}OCH_2CH_2OC(O)CHCH_2$ |
| | F. | $C_{10}H_{13}OC(O)CHCH_2$ |

TABLE II

| Example No. | Component (1) WT. | % | Component (2) WT. | % | Component (3) WT. | % |
|---|---|---|---|---|---|---|
| 1 | 1A | 50% | 2A | 35% | 3A | 15% |
| 2 | 1A | 50% | 2A | 25% | 3A | 25% |
| 3 | 1A | 50% | 2B | 25% | 3A | 25% |
| 4 | 1A | 50% | 2C | 25% | 3A | 25% |
| 5 | 1B | 50% | 2B | 25% | 3A | 25% |
| 6 | 1A | 50% | 2B | 35% | 3A | 15% |
| 7 | 1A | 50% | 2B | 35% | 3A | 15% |
| 8 | 1A | 50% | 2B | 30% | 3A | 20% |
| 9 | 1D | 50% | 2A | 35% | 3A | 15% |
| 10 | 1A | 50% | 2A | 35% | 3B | 15% |
| 11 | 1C | 50% | 2B | 35% | 3A | 15% |
| 12 | 1A | 50% | 2D | 35% | 3A | 15% |
| 13 | 1C | 50% | 2D | 35% | 3A | 15% |
| 14 | 1A | 50% | 2A | 30% | 3E | 20% |
| 15 | 1A | 50% | 2A | 40% | 3C | 10% |
| 16 | 1A | 50% | 2A | 45% | 3C | 5% |
| 17 | 1A | 50% | 2A | 30% | 3D | 20% |
| 18 | 1A | 50% | 2A | 35% | 3D | 15% |
| 19 | 1A | 50% | 2A | 30% | 3C | 20% |
| 20 | 1A | 50% | 2A | 35% | 3C | 15% |
| 21 | 1A | 50% | 2A | 35% | 3E | 15% |
| 22 | 1A | 50% | 2A | 40% | 3E | 10% |
| 23 | 1A | 50% | 2F | 35% | 3D | 15% |
| 24 | 1A | 50% | 2C | 35% | 3D | 15% |
| 25 | 1A | 50% | 2B | 35% | 3D | 15% |
| 26 | 1A | 50% | 2E | 35% | 3D | 15% |
| 27 | 1E | 50% | 2A | 35% | 3D | 15% |
| 28 | 1B | 60% | 2A | 25% | 3D | 15% |
| 29 | 1F | 50% | 2A | 35% | 3D | 15% |
| 30 | 1C | 50% | 2A | 35% | 3D | 15% |
| 31 | 1A | 50% | 2A | 30% | 3F | 20% |
| 32 | 1A | 50% | 2B | 30% | 3F | 20% |
| 33 | 1A | 50% | 2E | 30% | 3F | 20% |
| 34 | 1A | 50% | 2D | 30% | 3F | 20% |
| 35 | 1A | 50% | 2F | 30% | 3F | 20% |
| 36 | 1A | 50% | 2C | 35% | 3F | 15% |
| 37 | 1G | 50% | 2B | 30% | 3F | 20% |
| 38 | 1G | 50% | 2E | 30% | 3F | 20% |
| 39 | 1G | 50% | 2F | 30% | 3F | 20% |
| 40 | 1G | 50% | 2C | 35% | 3F | 15% |
| 41 | 1G | 50% | 2D | 30% | 3F | 20% |
| 42 | 1C | 50% | 2B | 30% | 3F | 20% |
| 43 | 1A | 50% | 2A | 50% | | |
| 44 | 1A | 50% | 2B | 50% | | |

TABLE III

| Example No. | Fabric # 1 Oil H₂O/IPA | 2 | 3 | 4 | 5 | 6 | 7 | 8 | Leather # 1 | 2 | 3 | 4 Oil H₂O/IPA | 5 | 6 | 7 | Wood Oil H₂O/IPA |
|---|---|---|---|---|---|---|---|---|---|---|---|---|---|---|---|---|
| 1 | 5 50/50 | 6 ↑ | 6 ↑ | 7 ↑ | 6 ↑ | 6 ↑ | 5 ↑ | 5 ↑ | 3 50/50 | 5 ↑ | 4.5 ↑ | 5 ↑ | 3.5 ↑ | 6 ↑ | 6.5 ↑ | 6 50/50 |
| 2 | 5 50/50 | 5 ↑ | 5 ↑ | 6 ↑ | 4 ↑ | 4 ↑ | 5 ↑ | 5 ↑ | | | | | | | | 6 50/50 |
| 3 | 5 50/50 | 5 ↑ | 6 ↑ | 6 ↑ | 5 ↑ | 5 ↑ | 4 ↑ | 5 ↑ | 1.5 70/30 | 5 50/50 | 3.5 ↑ | 5 ↑ | 3.5 ↑ | 6 ↑ | 6 ↑ | 6 50/50 |
| 4 | 4 50/50 | 5 ↑ | 5 ↑ | 6 ↑ | 4 ↑ | 4 ↑ | 4 ↑ | 5 ↑ | 1 70/30 | 2 ↑ | 1 ↑ | 5 50/50 | 1 ↑ | 5 ↑ | 5 ↑ | 6 50/50 |
| 5 | 3.5 50/50 | 5 ↑ | 5 ↑ | 6 ↑ | 5 ↑ | 4.5 ↑ | 4 ↑ | 6 ↑ | | | | | | | | 6 50/50 |
| 6 | 2 50/50 | 6 ↑ | 6 ↑ | 7 ↑ | 5 ↑ | 6 ↑ | 5 ↑ | 5 ↑ | | | | | | | | 6 50/50 |
| 7 | 5 50/50 | 6 ↑ | 6 ↑ | 7.5 ↑ | 6 ↑ | 5 ↑ | 4 ↑ | 5 ↑ | | | | | | | | 6 50/50 |
| 8 | 5 50/50 | 6 ↑ | 6 ↑ | 7 ↑ | 6 ↑ | 5 ↑ | 5 ↑ | 5 ↑ | 1.5 60/40 | 3 50/50 | 2 ↑ | 2 ↑ | 3 ↑ | 4 ↑ | 6 ↑ | 6 50/50 |
| 9 | 2 50/50 | 5 ↑ | 5 ↑ | 6 ↑ | 5 ↑ | 4 ↑ | 4 ↑ | 5 ↑ | | | | | | | | 6 50/50 |
| 10 | 1 100/0 | 6 50/50 | 6 ↑ | 6.5 ↑ | 5 ↑ | 5 ↑ | 4 ↑ | 5 ↑ | | | | | | | | 6 50/50 |
| 11 | 4 50/50 | 6 ↑ | 6 ↑ | 7 ↑ | 6 ↑ | 6 ↑ | 6 ↑ | 6 ↑ | | | | | | | | 6 50/50 |

| Example No. | Fabric # 1 Oil H₂O/IPA | 2 | 3 | 4 Oil H₂O/IPA | 5 | 6 | 7 | 8 | Leather # 8 | 9 | 10 | 11 Oil H₂O/IPA | 12 | 13 | 14 | Wood Oil H₂O/IPA |
|---|---|---|---|---|---|---|---|---|---|---|---|---|---|---|---|---|
| 12 | 5 50/50 | 5 ↑ | 5 ↑ | 6 ↑ | 5 ↑ | 5 ↑ | 6 ↑ | 6 ↑ | 5 50/50 | 0 80/20 | 6 50/50 | 1 90/10 | 6 50/50 | 6 50/50 | 6 50/50 | 5 50/50 |
| 13 | 5 50/50 | 5 ↑ | 4 ↑ | 6 ↑ | 6 ↑ | 4 ↑ | 6 ↑ | 6 ↑ | 6 ↑ | 2 ↑ | 6 ↑ | 3 ↑ | 5 ↑ | 5 ↑ | 6 ↑ | 5 50/50 |
| 14* | 6 50/50 | 6 ↑ | 6 ↑ | 6 ↑ | 6 ↑ | 6 ↑ | 6 ↑ | 6 ↑ | 5 50/50 | 2 80/20 | 5 50/50 | 2 70/30 | 4 70/30 | 4 70/30 | 5 50/50 | 7 50/50 |
| 15** | 6 50/50 | 7 ↑ | 6 ↑ | 8 ↑ | 6 ↑ | 6 ↑ | 6 ↑ | 6.5 ↑ | 6 50/50 | 3 80/20 | 6 50/50 | 3 80/20 | 6 50/50 | 6 50/50 | 6 50/50 | 7 50/50 |
| 16 | 7 50/50 | 7 ↑ | 6 ↑ | 7 ↑ | 6 ↑ | 5.5 ↑ | 6 ↑ | 6 ↑ | 6 50/50 | 2 80/20 | 6 50/50 | 2 80/20 | 6 50/50 | 6 70/30 | 6 50/50 | 7 50/50 |
| 17 | 6 50/50 | 7 ↑ | 6 ↑ | 7.5 ↑ | 6 ↑ | 7 ↑ | 6 ↑ | 6.5 ↑ | 6 50/50 | 3 70/30 | 6 50/50 | 3 80/20 | 6 50/50 | 6 50/50 | 6 50/50 | 7 50/50 |
| 18 | 6 50/50 | 6 ↑ | 6 ↑ | 7 ↑ | 6 ↑ | 7 ↑ | 6 ↑ | 6 ↑ | 6 50/50 | 2 80/20 | 6 50/50 | 2 80/20 | 6 50/50 | 6 50/50 | 6 50/50 | 7 50/50 |
| 19 | 6 50/50 | 7 ↑ | 6 ↑ | 7 ↑ | 6 ↑ | 7 ↑ | 6 ↑ | 6 ↑ | 6 50/50 | 3 80/20 | 6 50/50 | 2 70/30 | 5 ↑ | 6 50/50 | 6 50/50 | 7 50/50 |
| 20 | 6 50/50 | 7 ↑ | 6 ↑ | 8 ↑ | 6 ↑ | 7 ↑ | 5 ↑ | 6 ↑ | 5 50/50 | 2 70/30 | 6 50/50 | 2 80/20 | 6 50/50 | 6 50/50 | 6 50/50 | 7 50/50 |
| 21 | 6 50/50 | 6 ↑ | 6 ↑ | 6 ↑ | 6 ↑ | 7 ↑ | 6 ↑ | 6 ↑ | 5 50/50 | 3 80/20 | 6 50/50 | 2 80/20 | 6 50/50 | 6 50/50 | 6 50/50 | 7 50/50 |
| 22* | 7 | 7 | 6 | 8 | 6 | 7 | 6 | 6.5 | 6 50/50 | 2 80/20 | 6 50/50 | 3 ↑ | 5.5 ↑ | 6 ↑ | 6 ↑ | 7 |

*Repellency after 11 days drying
**Repellency after 8 days drying

TABLE IV

| Number | Fabric Description (Upholstery) |
|---|---|
| | Composition |
| 1 | Merrimac M901 Lisere Rose |
| | 40% Rayon |
| | 30% Acetate |
| | 30% Polyester |
| 2 | Sun Spalding 7404 |
| | 64% Rayon |
| | 36% Polyester |
| 3 | Sun Zorina 7401 |
| | 64% Cotton |
| | 36% Polyester |
| | Test Fabrics |
| | 100% Nylon Taffeta |
| 5 | Valdese Weavers 327-7633 |
| | 57% Cotton |
| | 43% Rayon |
| 6 | Sun Keats 2417 |
| | 100% Cotton |
| 7 | Merrimac M881 - Rose |
| | 66% Polyester |
| | 18% Acrylic |
| | 16% Cotton |
| 8 | Sun Hamlet 2601 |
| | 100% Rayon |

| Wood Sample white birch Board | Leather Description |
|---|---|
| 1 | Doe Kid 9277 (Naked Finish) |
| 2 | Lamb Skin Suede 9236 |
| 3 | Pig Suede 9278 |
| 4 | Top Grain Chrom Tanned Cowhide |
| 5 | Suede Split 9272 |
| 6 | Top Grain Chrom Tanned Cowhide |
| 7 | Light Weight Top Grain Chap Cowhide Chrom Tanned |
| 8 | Chap Split |
| 9 | Buck Tan Cowhide |
| 10 | Chap Split |
| 11 | Elk |
| 12 | Vouge Split |
| 13 | Chap/Moc Split |
| 14 | Soft-Tan Garment |

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A hydrocarbon-soluble fluorinated terpolymer comprising the polymerization product of monomers comprising:
   (a) a fluorinated vinyl monomer containing at least one perfluoroaliphatic radical terminating in a $CF_3$ group and containing at least 25 percent by weight of its fluorine in the form of fluoroapliphatic radical;
   (b) an alkyl vinyl ester monomer where the alkyl group has 8 to 20 carbon atoms, and
   (c) an autoxidizable vinyl ester monomer which imparts autoxidizability to the terpolymer, selected from the group consisting of (1) a vinyl monomer having a pendant drying oil functionality and (2) a dicyclopentenyloxyalkylene vinyl ester and (3) a diclclopentenyloxy vinyl ester,
   said polymerization product being sufficiently soluble in odorless mineral spirits solvent for the application of odorless mineral spirit solutions containing effective amounts thereof to a variety of materials to substantially improve the oil- and water-resistance of such materials upon autoxidation curing of said terpolymer.

2. A terpolymer according to claim 1 comprising the polymerization product of a perfluoroaliphatic (meth) acrylic acid ester, a saturated fatty acid (meth) acrylic acid ester and an autoxidiable (meth) acrylic acid ester selected from the group consisting of (1) unsaturated fatty acid esters, (2) dicyclipentenyloxy ethyl esters and (3) dicyclopentenyloxy esters.

3. A terpolymer according to claim 2 comprising the polymerization product of (a) about 40 to 60% by weight of perfluoroalkylethyl (meth) acrylate, (b) about 20 to 50% by weight of stearyl (meth) acrylate and (c) about 5 to 30% by weight of an autoxidizable (meth) acrylic acid ester selected from the group consisting of (1) oleyl (meth) acrylate, (2) dicyclopentenyl oxy ethyl (meth) acrylate and (3) dicyclopentenyloxy (meth) acrylate.

4. A terpolymer according to claim 3 comprising about 50% by weight of monomer (a), about 25 to 40% by weight of monomer (b) and about 15 to 25% by weight of monomer (c).

5. A terpolymer according to claim 3 comprising the polymerization product of (a), (b) and (c) (1).

6. A terpolymer according to claim 3 comprising the polymerization product of (a), (b) and (c) (2).

7. A terpolymer according to claim 3 comprising the polymerization product of (a), (b) and (c) (3).

8. A composition for treating materials to render the surfaces thereof more resistant to penetration by oil and/or water, comprising a solution of a terpolymer as defined in claim 1 in a volatile organic solvent in a concentration of between about 0.5% and 5.0% by weight.

9. A composition according to claim 8 in which said solvent comprises odorless mineral spirits.

10. A composition according to claim 7 which further comprises a siccative or drier to assist in curing of the telomer.

11. A composition according to claim 10 which further comprises a volatile stabilizer to prevent premature curing of the telomer.

* * * * *

UNITED STATES PATENT AND TRADEMARK OFFICE
CERTIFICATE OF CORRECTION

PATENT NO. : 4,791,167
DATED      : December 13, 1988
INVENTOR(S) : John C. Saukaitis It is certified that error appears in the above-identified patent and that said Letters Patent is hereby corrected as shown below:

Abstract - line 2:

The word "autooxidizable" should read "autoxidizable".

Column 14, Table III, Example No. 14:

The asterisk should be removed.

Column 14, Table III, Example 16:

Place an asterisk next to 16.

Abstract - line 6:

The word "hydroarbyl" should read "hydrocarbyl".

Signed and Sealed this

Twenty-ninth Day of August, 1989

*Attest:*

DONALD J. QUIGG

*Attesting Officer*    *Commissioner of Patents and Trademarks*